United States Patent
Steinich

(10) Patent No.: US 7,239,129 B2
(45) Date of Patent: Jul. 3, 2007

(54) SENSOR BASED ON THE TRAVEL TIME PRINCIPLE WITH A DETECTOR UNIT FOR MECHANICALLY ELASTIC WAVES

(75) Inventor: Klaus Manfred Steinich, Zorneding/Pöring (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 164 days.

(21) Appl. No.: 10/964,225

(22) Filed: Oct. 13, 2004

(65) Prior Publication Data

US 2005/0132807 A1 Jun. 23, 2005

(30) Foreign Application Priority Data

Oct. 16, 2003 (DE) ................................ 103 48 195
Oct. 20, 2003 (DE) ........................... 203 16 059 U

(51) Int. Cl.
*G01B 7/14* (2006.01)
*G01B 7/26* (2006.01)
*G01F 23/30* (2006.01)
*H03H 9/22* (2006.01)

(52) U.S. Cl. ........................... 324/207.13; 324/207.24; 324/207.22; 73/290 V; 73/313; 73/314

(58) Field of Classification Search .................. 73/644, 73/617; 324/207.13, 207.24, 207.22
See application file for complete search history.

(56) References Cited

U.S. PATENT DOCUMENTS

| 4,939,457 | A | * | 7/1990 | Tellerman | ............... | 324/207.13 |
| 5,412,316 | A | | 5/1995 | Dumais et al. | | |
| 5,736,855 | A | | 4/1998 | Smith et al. | | |
| 5,986,449 | A | * | 11/1999 | Koski | .................... | 324/207.13 |
| 6,185,155 | B1 | | 2/2001 | Steinich | | |
| 6,232,769 | B1 | * | 5/2001 | Brunsch et al. | ........ | 324/207.13 |
| 6,356,071 | B1 | | 3/2002 | Koski et al. | | |

FOREIGN PATENT DOCUMENTS

| DE | 19753805 C2 | 9/1999 |
| DE | 19917312 A1 | 10/1999 |
| DE | 10234960 A1 | 2/2004 |

* cited by examiner

*Primary Examiner*—Hezron Williams
*Assistant Examiner*—Rose M. Miller
(74) *Attorney, Agent, or Firm*—Head, Johnson & Kachigian

(57) ABSTRACT

A position sensor based on the travel time principle of a mechanically elastic wave length having a wave guide, an electrical hollow return conductor, a detector coil attached to the wave guide and a position element which is movable along the wave guide which generates or detects mechanical elastic wave.

15 Claims, 11 Drawing Sheets

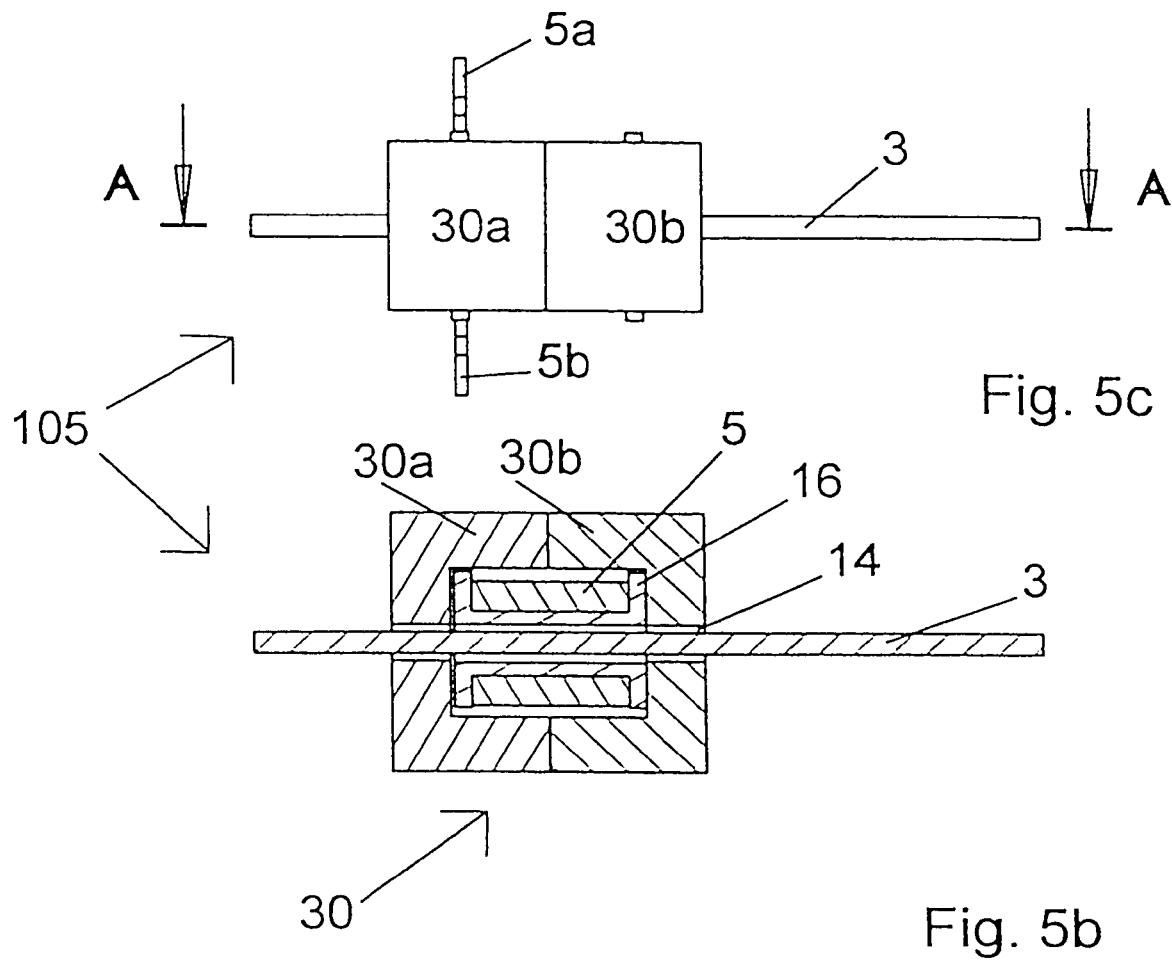
Fig. 5c
Fig. 5b
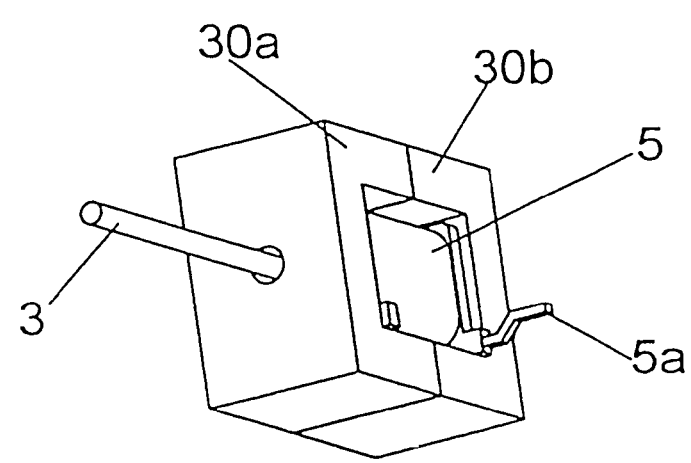
Fig. 5a

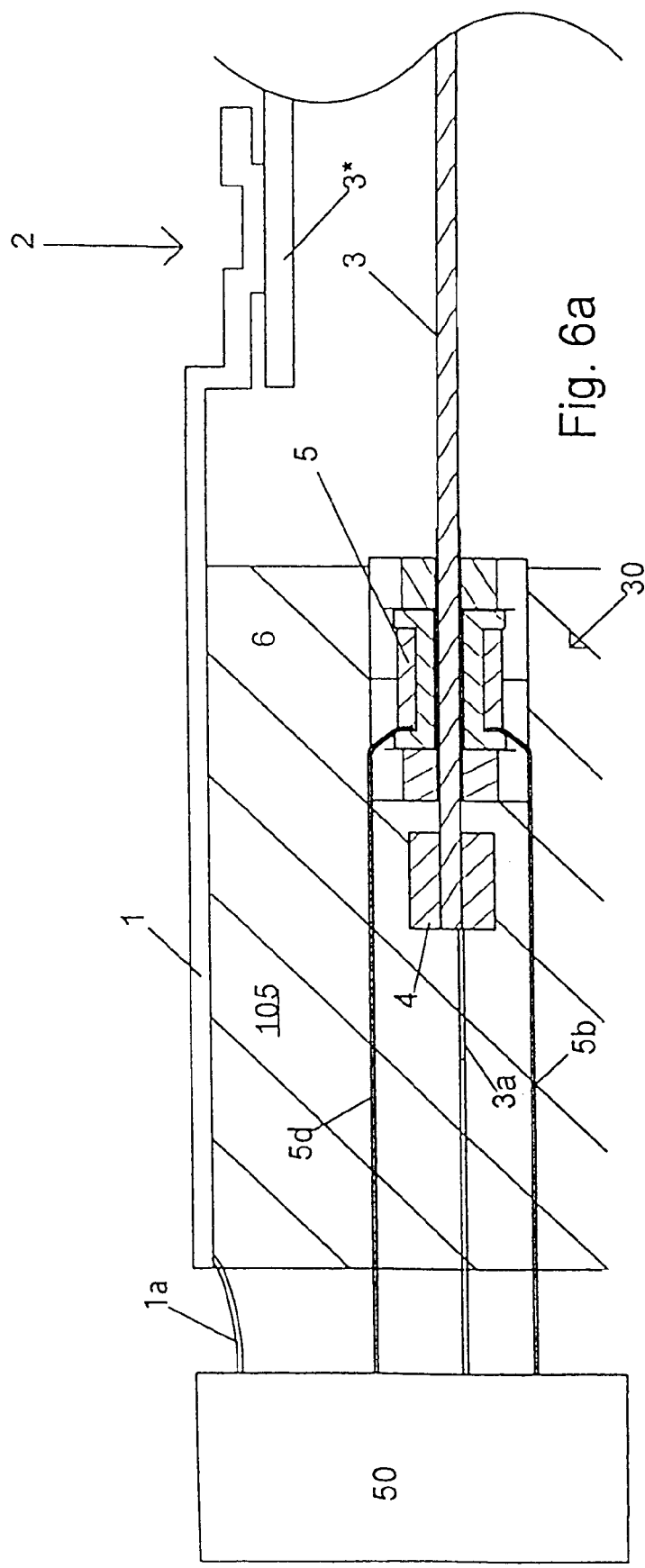
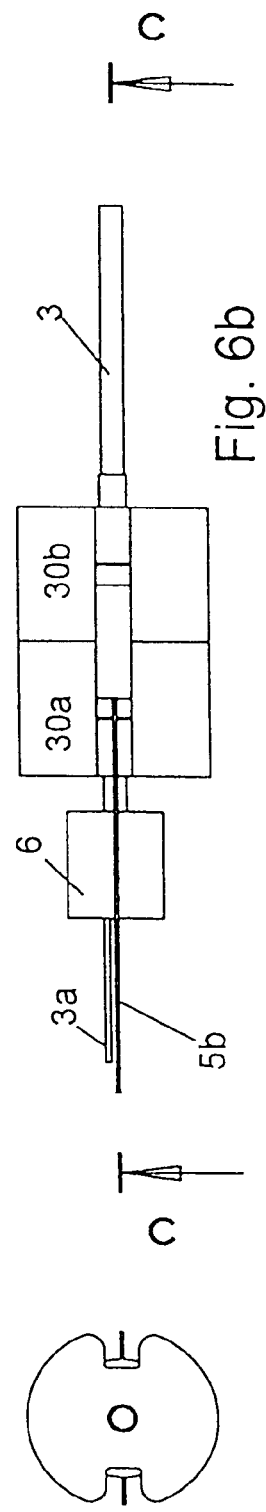
Fig. 6a
Fig. 6b
Fig. 6c

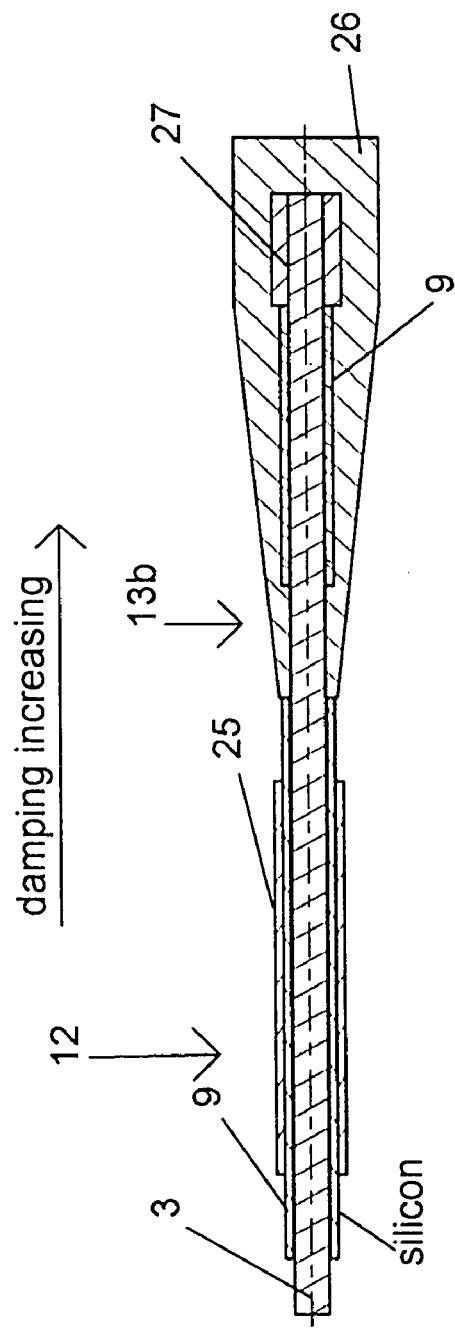
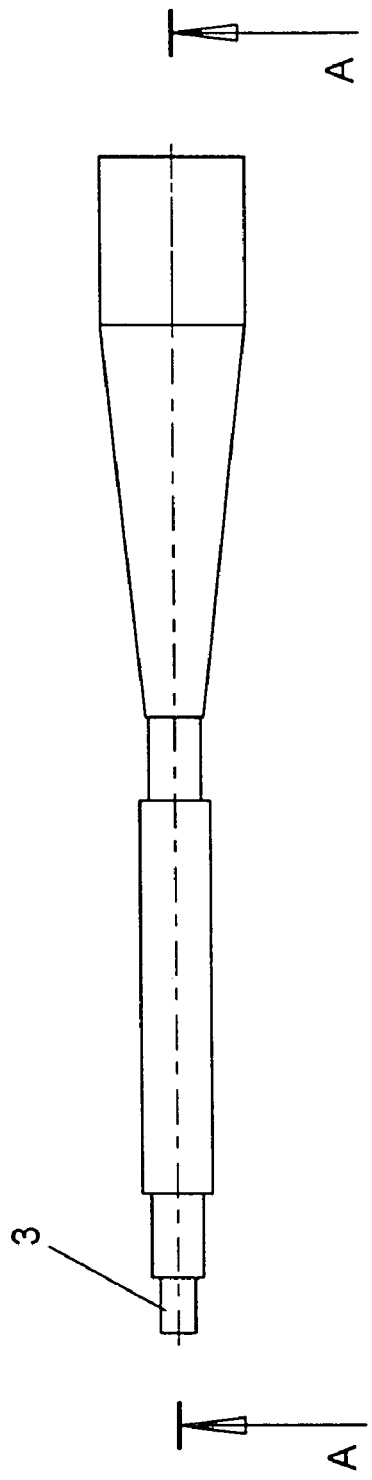
Fig. 8a
Fig. 8b

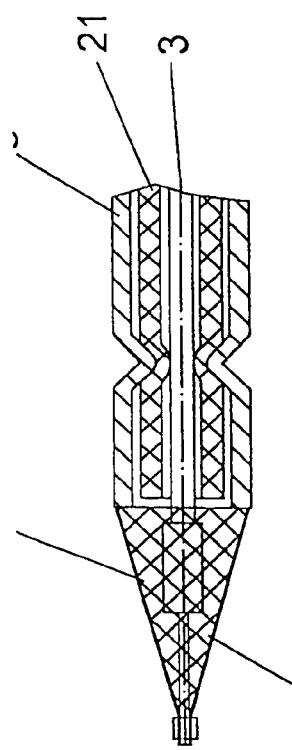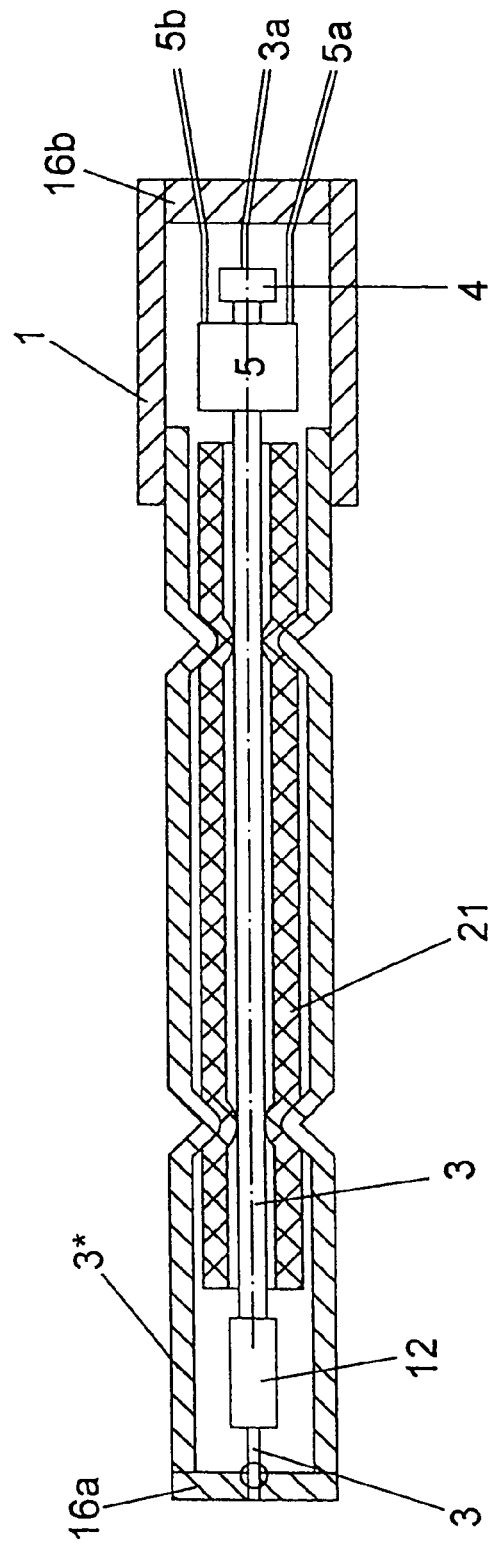
Fig. 9c
Fig. 9b

SENSOR BASED ON THE TRAVEL TIME PRINCIPLE WITH A DETECTOR UNIT FOR MECHANICALLY ELASTIC WAVES

CROSS-REFERENCE TO RELATED APPLICATION

This is United States Patent application which claims priority to German Application No. 10348195.8 filed 16 October 2003.

BACKGROUND OF THE INVENTION

Field of the Invention

This invention relates to position sensors, especially their detector unit, based on the principle of measuring the travel time of mechanical elastic impulses in a wave guide, which include, in addition to the wave guide, a position element, which is movable relative to it, which generates or detects the mechanical elastic wave.

The wave guide consists, as a rule, of a tube, a wire or a tape, and it may also serve as the electric conductor. The wave guide may be located in a linear or circular body of non magnetic material, which provides the shape, e.g. plastic or metal, which houses and supports the wave guide.

Based on the Wiedemann-effect, a current entering the wave guide generates a torsional impulse, due to its superposition with an external magnetic field, which is oriented laterally with respect to the magnetostrictive wave guide, and which originates from the positioning element, especially a positioning magnet, generates a torsional impulse in the shape of a mechanically elastic wave, which travels from the location of its origin, that is e.g. the location of the positioning element, in both directions along the wave guide at a rate of approximately 2500 m/s to 6000 m/s.

At a certain location, usually at one end of the wave guide, especially the torsional component of this mechanically elastic impulse is detected by a detector unit, which in most cases is located in a fixed position relative to the wave guide. In this process, the time interval between the release of the exciter current impulse and the receiving of the mechanical impulse is a measure for the distance of the movable positioning element, i.e. the position magnet, from the detector device, or from the coil or the electromagnet.

A typical sensor of this type is described in U.S. Pat. No. 896,714.

The main characteristic of the invention presented here consists of the detector device. This includes a detector coil, which may be installed around the wave guide or, as a so-called Villary-detector, around a Villary-tape, which is slanted, especially at a 90°-angle, with respect to the wave guide, and connected to it, especially mechanically fixed, e.g. welded, so that the torsional impulse traveling along the wave guide is transformed into a longitudinal wave within the Villary-tape. A longitudinal wave of this kind compresses, or extends the Villary-tape elastically in the crystalline range and therefore changes its permeability μ. For this purpose, the Villary-tape consists of a material with the maximum possible magnetic permeability $\Delta\mu r$, e.g. of nickel or a nickel alloy, in the form of an inherently stable tape material of approx. 0.05-0.2 mm thickness and 0.5-1.5 mm width.

Since $$\Delta U \approx N \times \frac{\Delta \Phi}{\Delta t} \rightarrow \Delta U \approx N \times \frac{\Delta B \times \Delta A}{\Delta t} = N \times \frac{\mu_0 \times \Delta \mu_r}{\Delta t} \times \frac{I \times N}{L}$$

we obtain $$\Delta U \approx \frac{\Delta \mu_r}{\Delta t} \times K$$

because the values for $\mu_o$, I, N, L can be assumed as constants.

The density wave traveling through a magneto-elastic element, e.g. the Villary-tape, manifests itself in a voltage change $\Delta U$, which can be picked up as a useful signal at the detector coil.

As shown, the useful signal $\Delta U$ is the greater, the greater the change in magnetic permeability $\Delta\mu_r$.

Additionally, that particular region of the curve $\Delta\mu_r(H)$, i.e. the magnetic permeability plotted above the magnetic field strength, is desired as the operating point or rather the operating range, in which the magnetic permeability $\Delta\mu_r$ changes linearly as much as possible, and as much as possible relative to the source which is why it is attempted to configure the slope of the function $\Delta\mu_r(H)$ as steeply as possible, and to establish the operating range in its approximately linear domain.

Due to the state of the art, a so-called bias magnet in the form of a permanent magnet is placed in spatial proximity to the detector coil, e.g., parallel to the Villary-tape, for adjusting the operating point.

The operating point of the magneto-elastic detector unit depends, in addition to the magnetic parameters of the bias magnet, mainly on its positioning relative to the detector-coil.

This is disadvantageous in several respects, for example for the operation of the position sensor at locations which are subjected to dynamic mechanical loads (or thermal loads as well), which modify the magnetic parameters of the bias-magnet and accelerate especially its aging process, which also results in a change of the magnetic parameters.

Additionally, all deviations from the nominal shape occurring during the manufacture of the bias-magnet are disadvantageous in the same way. The same applies to the fabrication dependent variations of the magnetic parameters during the production of the bias-magnet.

Another disadvantage consisted in the fact, that the operating point is modified negatively by too close an approach of the position magnet to the detector coil.

Therefore, the wave guide of a state of the art detector device had to be extended sufficiently far beyond the sensing range, within which the position magnet could move back and forth, that the detector unit including the detector coil was located sufficiently far from the measuring range in order to reduce the influence of disturbances to a manageable level. However, this always resulted in a total length of the position sensor which was significantly longer than its measuring range.

In the following text, the design of the detector unit with a detector coil is arranged coaxially around the wave guide, without limiting the invention to this, because it is also applicable as a Villary-detector.

BRIEF SUMMARY OF THE INVENTION

According to the invention, the task consists in creating a position sensor of the type, which can be produced simply and cost effectively, in spite of a high quality and good interpretability of the signals provided by this sensor, and especially with a good ratio of useful signal to disturbance signal.

This problem is solved by the characteristic features of claims 1, 19, and 26. Advantageous designs are derived as per the subordinate claims.

In the middle of the range, i.e. basically in the measuring range, of the sensor, the wave guide is located in a hollow return conductor, which consists of conductive, however non-magnetic material, so that this hollow return conductor does not generates any magnetic field in the interior, so that it is subsequently only generated by the electrically impinged wave guide and is influenced by the position magnet at the point of measurement. This yields a good ratio of useful signal to disturbance signal.

This effect occurs already, when the wave guide, viewed in its cross section, is only partially surrounded by the hollow return conductor, and also, if the cross sectional shape of the hollow return lead deviates from that of a circular cross section. Hence, the hollow return conductor can consist of a slotted tube, two U-profiles, two angle-profiles placed adjacent to each other to form a rectangle, or a U-shaped rail with one open side, in the free center space of which the wave guide is located.

And this effect is achieved, regardless, whether the hollow return conductor consists of a pipelike, i.e. stiff structure, or of a flexible, hoselike structure. Also, penetrations in the outer surface, be they in a rigid pipe or in a braided hose, or parallel running or spirally wound individual fibers are harmless, as long as an altogether sufficient magnetic shielding of the wave guide is achieved. In the case of individual fibers or wires of the hollow return conductor, the fibers/wires may contact each other, which is the case especially in a hose like braiding, or they have no contact, as for example, if one or even several fibers are oriented axially or spirally adjacent to each other within the casing, and are supported by a base material, as e.g. made of plastic.

It is especially advantageous, if the hollow return conductor features a closed cross section.

It is most advantageous, if this hollow return conductor has a thermal expansion in a longitudinal direction, which approximates that of the wave guide, because in this case the end of the return conductor can be connected mechanically with the wave guide without length compensation, without the different axial expansions due to temperature changes leading to an axial prestress of the wave guide, or rather to a change of the existing prestress.

Preferably, the hollow return conductor therefore consists at least partially of titanium or carbon fiber.

As far as differential axial expansions are to be considered, the hollow return conductor can be strained preferrably in an axial direction, especially under such a small change of its axial stress, that even in the case of the connection of the hollow return conductor with the wave guide, at the free end, the axial strain of the wave guide suffices to axially strain the return conductor accordingly.

In order to optimally utilize the described effects, the wave guide is located in a defined location within the cross section of the hollow return conductor, especially coaxially in its center, e.g with the help of a spacer pipe or spacer hose, which consists of an electrically non conductive and non-magnetic material, e.g. of plastic, preferably between the wave guide and the return conductor.

The cross sections of these three components should be dimensioned relative to each other such that along a the major portion of the wave guide length no radial forces are applied against the wave guide, with the exception at the supports of the wave guide effected at the defined axial intervals and points. This can be accomplished by using a hollow return conductor, e.g. in the form of an inherently stable pipe, and by reducing the inner cross section of the hollow return conductor by crimping it (along the complete circumference or only at two areas located opposite to each other) and this way also the spacer hose, which also serves as a spacer, and pressing it against the outer circumference of the wave guide.

On the outer circumference of the hollow return conductor as well, an external spacer can be installed for keeping a distance to the supporting profile or similar structure, into which the position sensor can be completely inserted. This external spacer consists of material, which is somewhat compressible, preferably in its radial direction, furthermore is made of a material that is electrically non conductive and non magnetizable, especially a textile or synthetic material, which may for instance feature radially exposed filaments, bristles, or other projections. Such an external spacer can be arranged as a helical or longitudinal strip on the outer circumference of the hollow return conductor.

One possibility for this is a pipe or hose made of a synthetic material, as for example silicone, on the outer closed pipe cross section of which additional outwardly radiating and/or possibly inward extending projections are featured, which are preferably tapered to a tip at their free ends, and which result in a corresponding positioning of the components with respect to each other. These types of construction yield simple manufacturing possibilities due to simple insertion and possibly the crimping of individual components against each other at defined axial intervals.

The detector range is located opposite of this center range in which the detector coil is positioned, preferably at one of the two ends of the wave guide.

By arranging the detector coil concentrically around the wave guide and the additional placement of a current carrying body at least partly around the detector coil, the quality of the obtained signals is improved again, especially the relation of useful signals to disturbing signals.

It is especially advantageous, —when for example viewed in the side view of the wave guide—if by the the flux carrying body and together with the wave guide, a most completely closed magnetic circuit is formed, while the current conducting body must not come into contact with the wave guide. A gap of minimum width exists between these two components, which is for example filled with a thin foil of isolating plastic. Naturally, the current conducting body may completely surround the wave guide—this time viewed in a longitudinal direction—which provides especially good shielding.

The effect described above is additionally improved, if the complete detector arrangement, that is the detector coil as well as the conductor component surrounding it, is further surrounded by a shield of highly permeable material, especially a cartridge, the so-called detector casing.

The detector casing is connected electrically and preferrably mechanically as well with the hollow return conductor, by the fact that the detector casing features an interior diameter, which is slightly larger than the outside diameter of the hollow return conductor, extends axially beyond its front end, and is mechanically rigidly connected to the outside diameter of the return conductor, for example by an electrically conductive adhesive, soldering, welding, or even crimping, as long as this also results in a full electromagnetic connection. Additionally, the detector casing should include an electrically isolating coating on its outside to permit its insertion into a support profile of electrically conductive material.

Only four electric leads extend out of the free end of the open front of a detector casing manufactured this way, namely two serving as connectors for the detector cartridge, one as the connector for the wave guide, and one as the connector for the hollow return conductor, so that especially one connector unit for contacting these four electric leads can be located at the open front end of this otherwise closed detector cartridge, which is connected to the hollow return conductor, wherein its electromagnetic density can be further increased.

The goal of a good signal at the free end of the wave guide, which faces away from the detector location, the so-called damping range, is furthered and simultaneously the producibility of the sensor is simplified because there the wave guide reaches into a damper arrangement, in which the mechanically elastic wave traveling along the wave guide is increasingly dampened up to the absolute end of the wave guide so that from there, if possible, no wave is reflected in the opposite direction.

For this purpose, the wave guide protrudes out of the spacer hose of the center range and into the damper arrangement, or the spacer hose is—for a given case in a modified condition—itself a component of the damper layout.

This way the spacer hose already present at the free end of a very simple configuration can be dimensioned shorter than the wave guide and the hollow return conductor, so that these two components always have direct contact to each other at the end, for example by full mechanical and electrically conducting connections. The damping arrangement is realized by the fact that the hollow return conductor with respect to its axial length and/or radial impression is compressed increasingly in shorter intervals and more intensively.

Another possibility consists in the possibility of applying the radial compression on the wave guide over the damping range via a shrink-hose made of synthetic material over a defined length, possibly even by using the spacer hose as a shim.

In place of the hollow return conductor a separate end sleeve can be used in the damping range for the purposes described above, which must however be connected electrically conductively to the free end of the coaxial return conductor, and should leave the shortest possible axial gap with respect to it.

This type of end sleeve should also consist of electrically conductive material, especially metal.

BRIEF DESCRIPTION OF THE DRAWINGS

One type of design according to this invention is described below in detail using figures. They show:

FIG. 5(a)-(g): first configuration of the detector arrangement

FIG. 6(a)-(c): another configuration of the detector arrangement.

FIG. 8(a) and (b): a second configuration of the damper arrangement; and

FIG. 9(a)-(c): longitudinal sections of additional position sensor layout.

BRIEF DESCRIPTION OF THE PREFERRED EMBODIMENTS

Figures 1A, 1B:
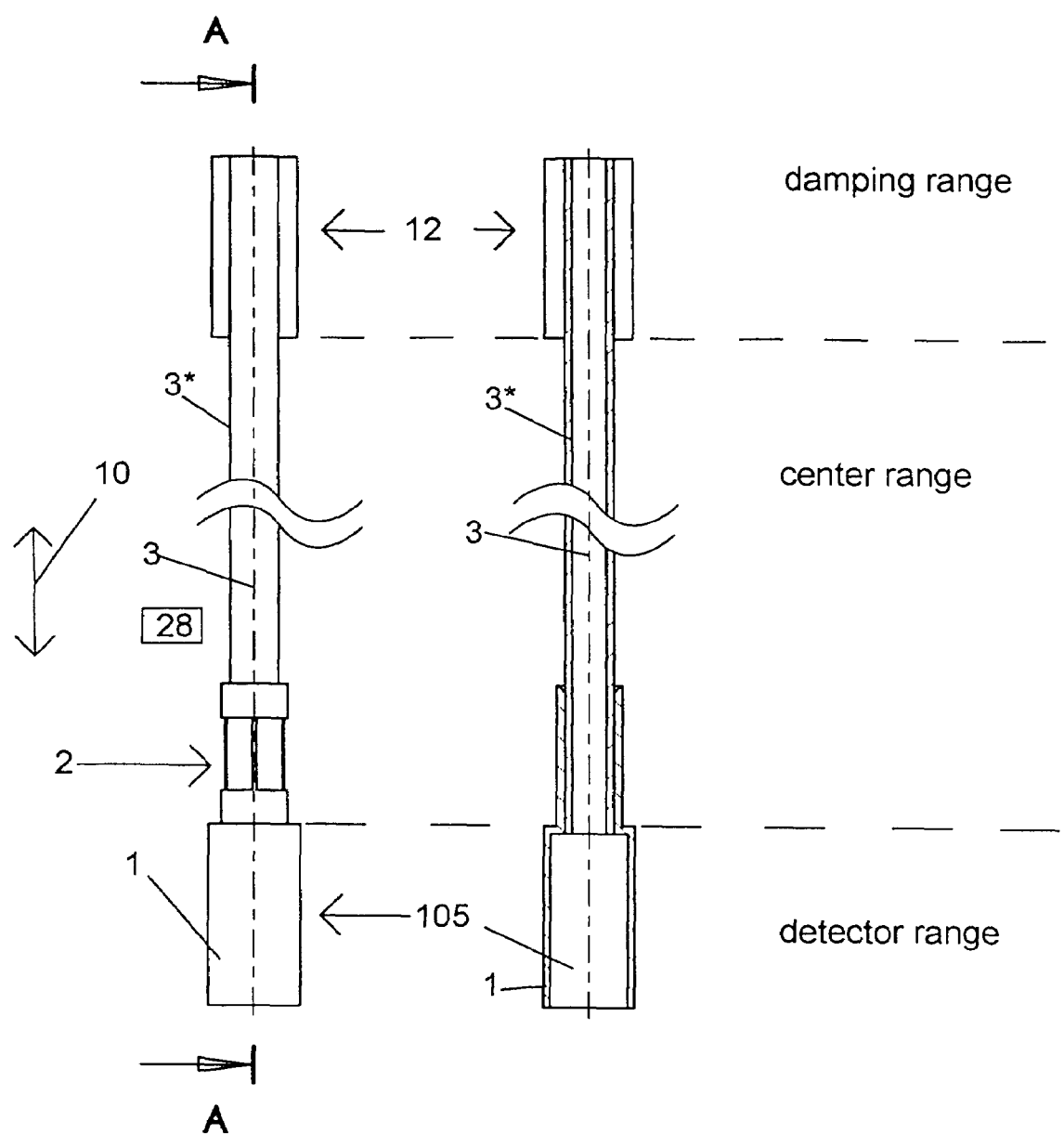
FIG. 1(a) and (b): overall view of the position sensor

FIGS. 1a and 1b show a side view or rather a longitudinal section of the position sensor in a schematic presentation, yet not with all its components:

The hollow return conductor 3* extends in an axial direction, especially in its center range, and coaxially in its interior the wave guide 3, indicated by the dashed and dotted line. In actuality, this consists of a solid wire or rather a rod or a pipe, preferably with a circular outer cross section, of an electrically conductive material with specific magnetic properties. In practical use, the positioning magnet 28 is moved in the direction of measurement 10, that is parallel to the wave guide extension 3, and its position is obtained by the detector arrangement 105 and a detector circuitry possibly connected with it.

The detector arrangement 105 is located at a position of the wave guide 3, preferably at one end of it, while at its other end, the so-called free end, a damping arrangement 13 is located coaxially as well, by which the damping range is defined.

Figure 2:
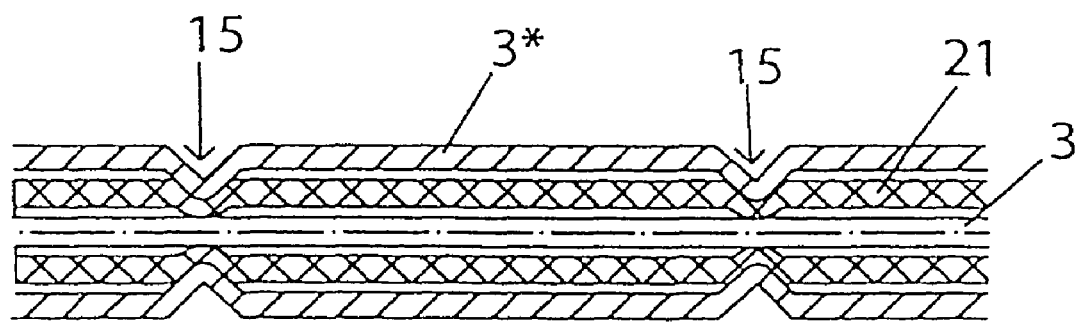
FIG. 2: view of the cross section in the middle range

FIG. 2 shows an enlarged longitudinal section of the center range:

Thus, it is clear that the centrally extending wave guide 3 is supported in this central coaxial position within the hollow, especially pipe shaped return conductor 3*, by a spacer hose 21, which also surrounds the wave guide 3 coaxially and is placed between the two. This is dimensioned such that it bears no pressure against the inner circumference nor against the outer circumference of the wave guide 3 within the normal cross section of the hollow return conductor 3*.

There is a bearing in radial direction under pressure only at the support locations 15 which are placed at certain axial distances or positions, generated by the crimping of the hollow return conductor 3* towards the center at these support locations 15, and due to this a bearing of the spacer hose 21 at these locations against the wave guide 3.

Figure 3:
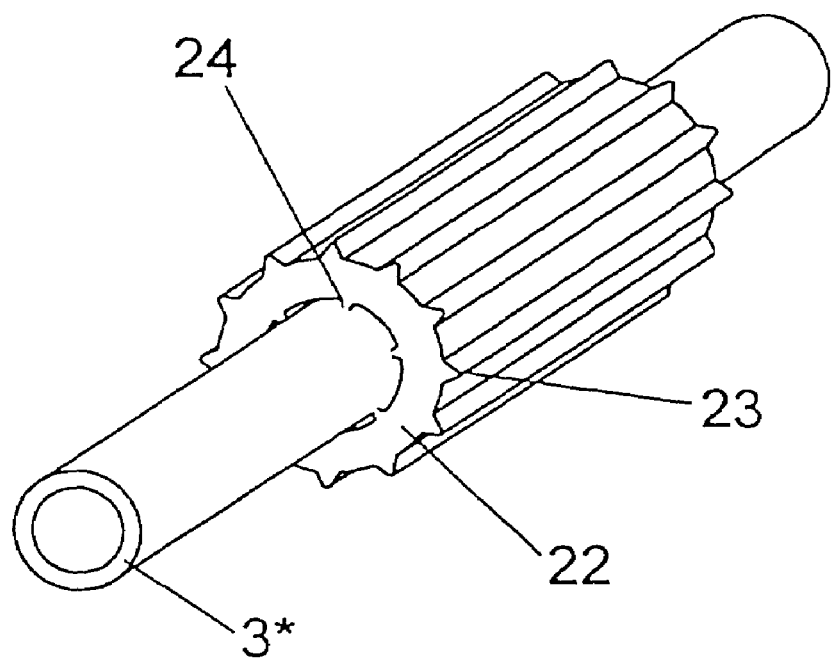
FIG. 3: a first variant of the outer spacer

What is not yet drawn into FIGS. 1 and 2, is an external spacer on the outer circumference of the hollow return conductor 3' in order to position it with respect to the larger interior circumference as defined by a support profile or a similar component. In accordance with FIG. 3—preferably over the complete length of the center range—an external hose 22 which is slid coaxially over the hollow return conductor 3* and made for example of silicone, the cross sectional profile of which features protruding sharp ridges 23, distributed over its circumference, for example longitudinally extending webs as well as elevations 24, which incline from the interior circumference against the hollow return conductor 3*. The elevations 23, 29 are dimensioned such that they are slightly compressed by the adjacent components and thus generate a stable support in spite of its capability of axial movement and insertion.

Figure 4:
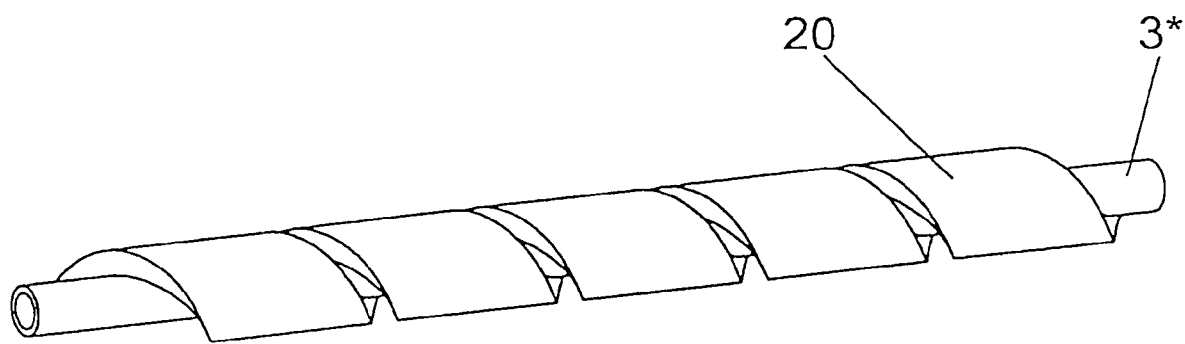
FIG. 4: a second variant of the outer spacer

As an alternate design to this, FIG. 4 shows an external strip 24 in the form of a single helix for example, which is bonded to the outer surface of the hollow return conductor 3*, and can be compressed in a radial direction, for instance due to its structure, as fibers, bristles or similar.

FIGS. 5 and 6 are related to the detector layout 105 provided in the detector range:

As FIG. 5a shows isometrically and FIGS. 5b and 5c show in two individual side views or rather in sections for a first configuration, a detector coil 5 of an isolating material, wound over a coil core 16, is slid over the wave guide 3 within the detector range so that the wave guide 3 penetrates the coil 5 preferrably coaxially.

The detector coil 5—as is visible in the side view of FIG. 5b—is almost completely surrounded by a, in the side view ring shaped, flux carrying body 30, which consists of two C-shaped halves 30a, b, in which an opening has been provided in their connecting legs, for sliding over the wave guide 3 at the corresponding side so that the two halves can be moved towards each other by their free legs until contact is made. Prior to the sliding, a protective sleeve 14 is placed over the wave guide 3 in order to avoid mechanical and thus also electrical contact between the wave guide 3 and the flux carrier 30. For this purpose, the protective sleeve 14 extends preferably over the complete length of the flux carrier 30.

The flux carrier 30 shown ring shaped in the side view is open on two sides opposite to each other so that the electrical connections 5a, b of the detector coil 5 can be directed to the outside, in a given case to remote detector circuitry 50, as indicated in the layout of the detector configuration 105 in FIG. 6.

The magnetic flux path made possible by the flux carrier 30 extends—as is best illustrated by by the side view of FIG. 5—along the closed ring formed by the two C-shaped halves 30a, b. Even in the area where the wave guide 3 penetrates these halves 30a, b, the magnetic flux will travel a path around the wave guide 3 because of the protective sleeve 14 between the wave guide 3 and the flux carrier 30.

It is sufficient for a positive effect on the signal generated by the detector coil 5 if the path of the magnetic flux made possible by the flux carrier 30 encloses the detector coil 5 only partially, and if in a given situation the wave guide 3 itself is a part of the magnetic flux's path.

Figure 5E:
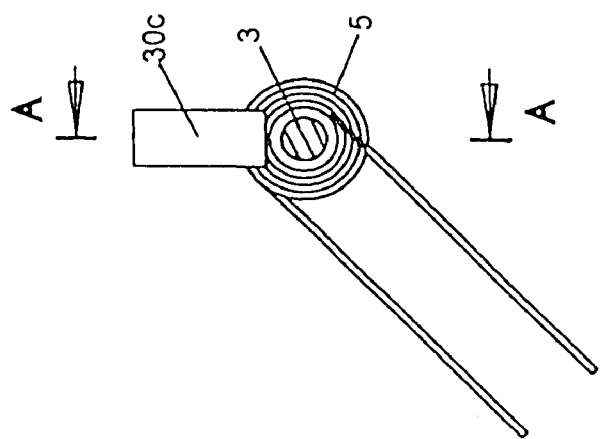
Figure 5D:
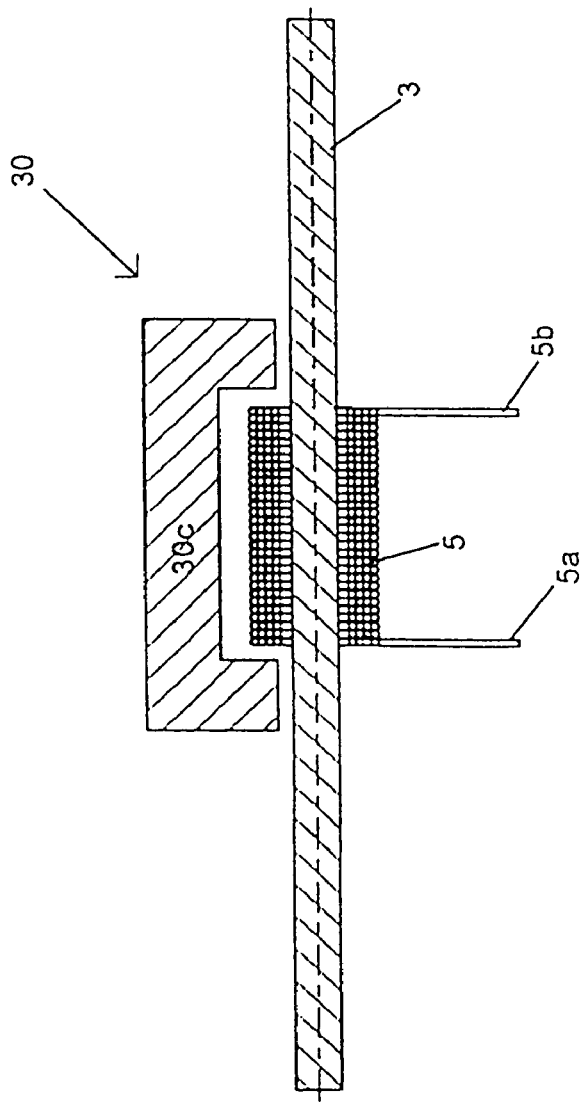

FIGS. 5d and e show a solution in the side view and a front view in which at one location of the circumference of wave guide 3 and this way also of the detector coil 5, which is coaxially guided on it, a C-shaped component 30c is placed over the coil 5 as the flux carrier such that the free end of component 30c is directed towards the outer circumference of wave guide 3 and that the connecting leg of the C-shape 30c is oriented parallel to wave guide 3 and is located outside of coil 5. In this configuration the path of the magnetic flux extends through the C-shape of C-component 30c and back through the corresponding portion of wave guide 3 which closes it in a ring shape through the air gap between the wave guide and over the C-component 30c.

Naturally, the positive effect on the useful signal is the stronger, the more the detector coil 5 is surrounded by the path of the magnetic flux of the flux carrier 30.

This can be accomplished, for example, if several C-components 30c are placed over the circumference and overlap the detector coil 5.

Figure 5G:
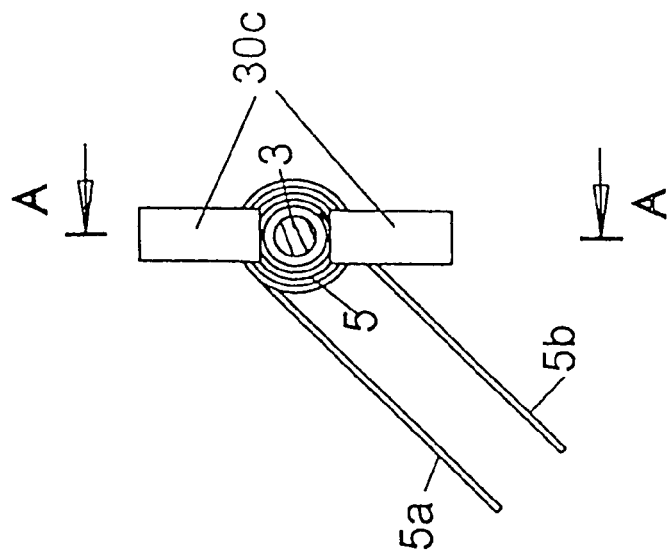
Figure 5F:
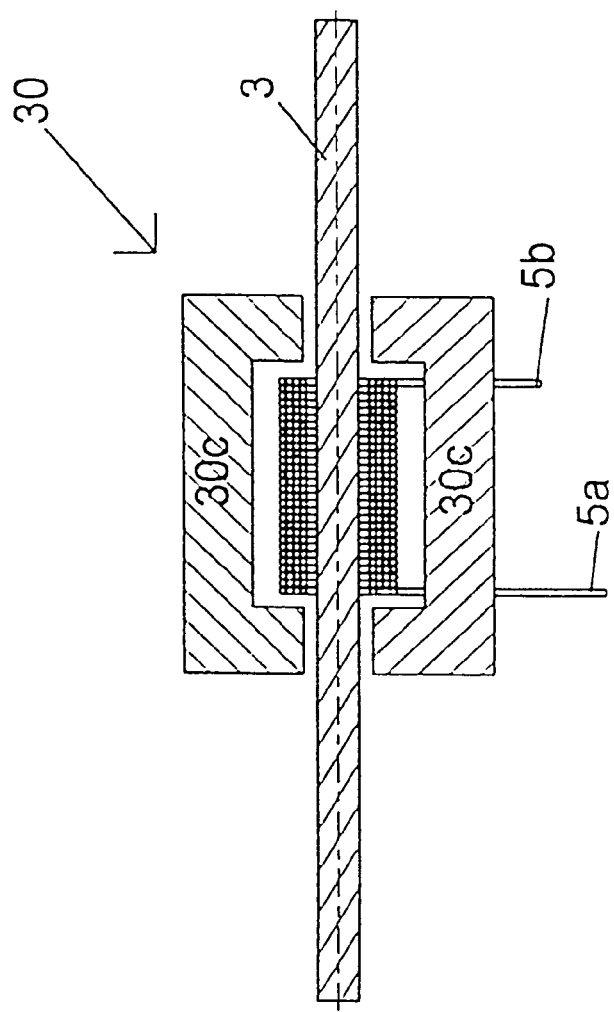

FIGS. 5f and 5g show a solution in the side view and front view, in which two C-components 30c are placed diametrically opposite to each other with respect to the wave guide 3 for this purpose, however the number of C-components 30c may be arbitrarily increased.

The ideal case is represented by a flux carrier 30 which surrounds the detector coil 5 as completely as possible since this results in an optimally complete enclosure of the detector coil 5 by the path of the magnetic flux.

Besides this, the FIGS. 5d-g show also, that the detector coil 5 may be configured as a self supporting coil, i.e. it does not necessarily have to be installed on a coil core 15.

Primarily, additional components of the detector configuration 105 can be recognized in FIG. 6, namely a detector casing 1, which coaxially encloses the detector coil 5 and, at a distance the flux carrier 30, and which extends in a longitudinal direction beyond the front end of the hollow return conductor 3' of the center range, and is mechanically rigidly pressed against it at a crimping location 2, or solidly connected with it in some other fashion, mechanical as well as electrically conductive, and electromagnetically as close as possible, as is visible in the schematic drawing of FIG. 1.

Further, it is indicated in FIG. 6a, that after completion the range of the flux carrier 30 up to approximately the free end of the detector casing 1, may be encapsulated with a hardening, electrically non-conductive sealing compound as for example synthetic resin, and that subsequently only four connecting leads are required for the connection of detector device 105 with a remotely located detector circuitry 50. These are the two electrical connections 5a, b, of detector coil 5, the electrical connection 3a, which is connected to wave guide 3, and connection 1a, which is connectected to detector casing 1 and via this also to the hollow return conductor 3*.

In addition, FIG. 6a shows that at the far side of the center range, a plate shaped anchor component 4 is connected mechanically rigidly and preferably also electrically conductive to the free end of wave guide 3 which provides for the secure anchoring of this end of wave guide 3 to a structural component of the adjacent area, for example, to the subsequent sealant, namely the cured sealing compound.

Also the two halves 30a, b of the flux carrier 30 differ slightly in design in FIG. 6, in which their free sides extend downward far enough to barely permit the open side to allow access to the electrical connections 5a and 5b respectively of the detector coil 5.

Also the design configuration according to FIG. 5a is acceptable for the completion of the sensor in detector casing 1, and in a given case is sealed as well, that is, it is handled in a fashion analog to the configuration of FIG. 6.

Figure 7:
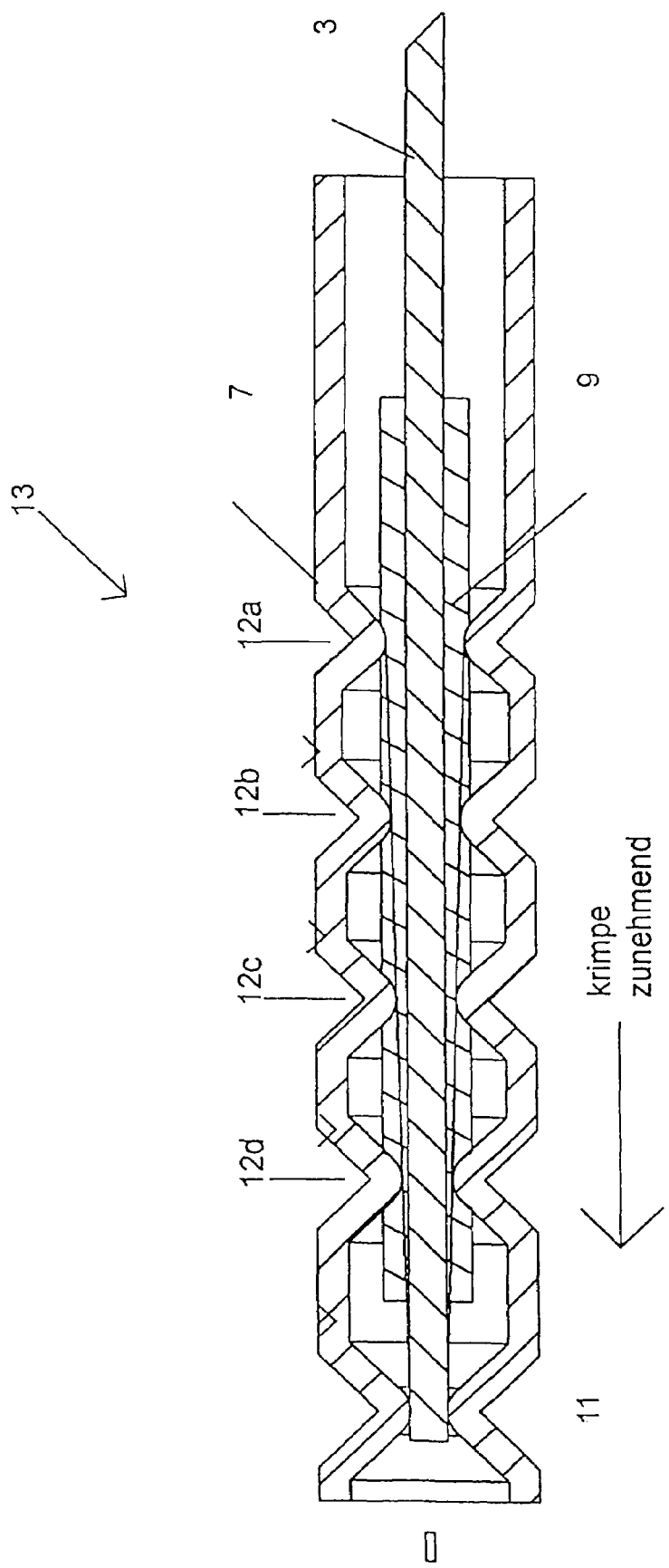
FIG. 7: a first configuration of the damper arrangement

FIGS. 7 and 8 show configurations of the damper arrangement 13 in the damping range.

According to FIG. 7, a damper hose 9 is slipped over the end range of wave guide 3 such that the free end of wave guide 3 protrudes somewhat out of this damper hose 9.

The goal consists of allowing the damping of wave guide 3 to increase over the length of of the damper hose in the direction of the free end of wave guide 3 so far that a mechanically elastic wave arriving here can be dampened to zero by the wave guide within the damping arrangement 13.

For this purpose, an end casing 7 is placed around the end range and coaxially with a gap around the damping hose 9, the inside diameter of which maintains at the base level a distance to the outside diameter of the damping hose 9. Due to radial compression (e.g. by crimping), preferably over the complete circumference (by additional separate crimping casing or direct crimping of the end casing), the end diameter of the end casing 7 equals the outer diameter of damping hose 9 and even penetrates it somewhat, increasingly with each crimping location 12a . . . in the direction towards the free end of wave guide 3.

This way the radial pressure impingement of the wave guide and hence the damping continually increases at the crimping locations. The final crimping location is already located in the range outside the damping hose 9, while the end casing 7 extends directly to the outer circumference of wave guide 3 and remains in contact with it subsequent to the crimping, by which the electrical contact between end of wave guide 3 and end casing 7 is formed.

To permit the feedback of the electric impulse, this end casing 7 is connected electrically conductive with the hollow return conductor 3*, and it may also be designed as a single unit together with it, or be slipped over it and be mechanically rigidly connected with it.

FIG. 8 show a different type of damping arrangement 13, namely one with a main damper 13b, which is placed at the free end, and a predamper 13a, which is placed to the back of it.

The predamper 13a may also for example consist of a damping hose 9 which is slipped over the wave guide 3 and in a given case is crimped on, possibly consists of silicone or some other synthetic material, over which an element producing the axial prestress, possibly a shrinkdown hose or a precrimped casing 25, is then slipped coaxialy.

The main damper 13b serves the same purpose as described in FIG. 7, it is however, designed differently, according to FIG. 8b, since in the axial arrangement first a damping hose 9, again consisting of silicone for example or some other soft synthetic material, then axially connected a contact casing 27, for electrical contact with the wave guide, is directly slipped over the wave guide 3. From this contact casing 27, the electrical connection to the return conductor, especially a surrounding hollow return conductor 3*, is also possible.

To effect the damping, the damping hose 9 and the contact casing 27 are enclosed in an end casing 26 of synthetic material, especially sealed, preferably over their complete length including the free front end surface, while the end casing 26 features an outside diameter increasing towards its free end, especially conically, which results in increased damping towards the end.

Figure 9A:
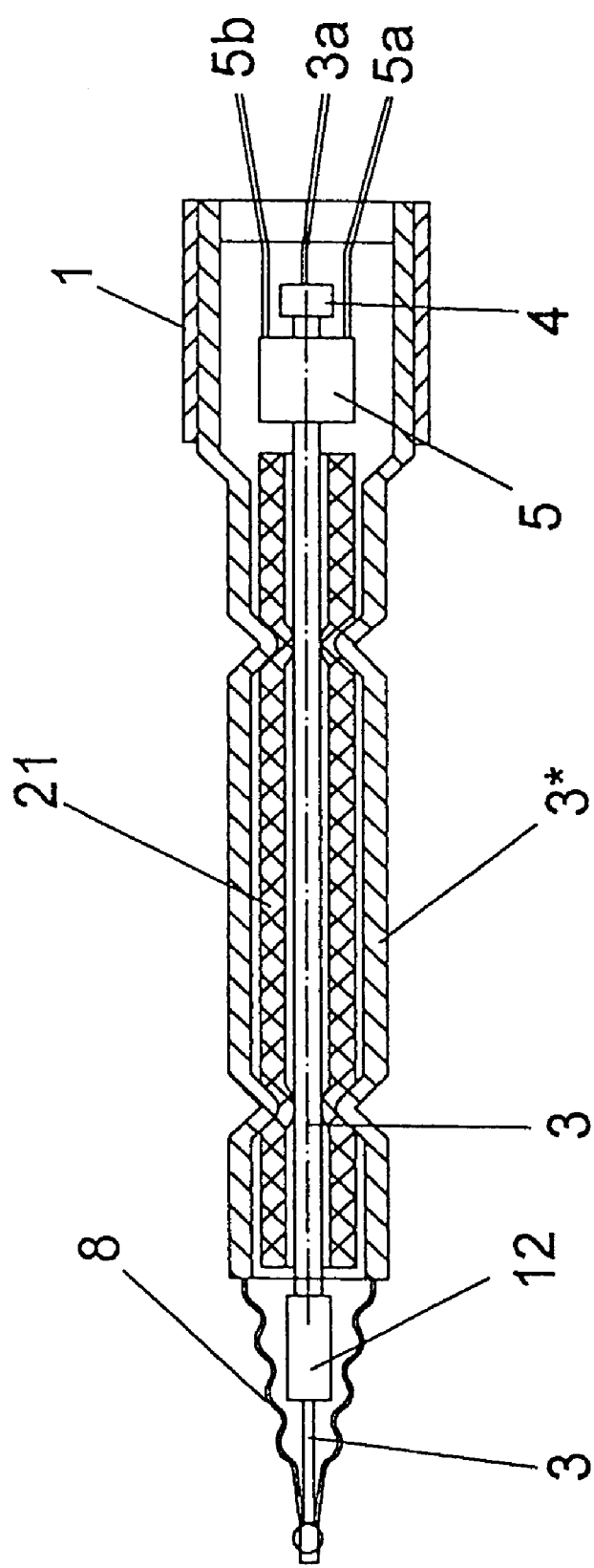

FIGS. 9a and 9c show embodiments which correspond in the center range—presented in a shortened fashion—to the design according to FIG. 2

In the detector range, the right end in FIG. 9a, this solution shows however a different configuration than for example FIG. 6a:

In FIG. 9a, the hollow return conductor 3* extends from the center range over the complete detector range, so that detector coil 5 and anchor component 4 even on the end of wave guide 3 are still located within the axial range of the hollow return conductor 3*. However, within the detector range the return conductor 3* is enlarged with respect to the center range and features a larger inside diameter.

A detector casing 1, which preferably consists of a highly permeable metal, especially μ-metal, is slipped over the equally increased outside diameter of the hollow return conductor 3*.

And so, among others things, the electrical connections protrude out of the open end shared with the detector casing 1 and the hollow return conductor 3*, namely the connections 5a, b for the detector coil 5 and the electrical connection 3a for the electrical conductor 3.

In contrast to this and according to FIG. 9b, the detector range is configured such that here the hollow return conductor 3*, extending from the center range, does not quite reach the detector coil 5 in an axial direction, and it does not feature an increased diameter at this end.

The detector casing 1 covers the complete detector range in an axial direction, and in the overlapping range, between the center range and the detector range, it is slipped with its inside diameter fitting on the outside diameter of the return conductor 3* and firmly joined to it.

Additionally, the free open far end of the detector casing 1 is closed off by an inserted cover 16d, which preferably consists of an electrically non conductive material since it has to be penetrated by the electrical connections.

The damping range at the left end in FIG. 9a is characterized in that there the wave guide 3 extends in an axial direction beyond the spacer hose 21 and the hollow return conductor 3*, and also supports the damping assembly 12 in this transition range.

The wave guide 3 protrudes in particular beyond the damping assembly 12 and at its free end is connected electrically conductive with at least one electrical conductor 8, the other end of which is connected electrically conductive with the hollow return conductor 3*. In this situation, the electric conductor 8 is designed in a wavy or spiral shape, or in some other fashion to permit compensation of length differences, in order to balance differential length changes of wave guide 3 the on one hand, and of the hollow return conductor 3* on the other hand. The electrical conduction 8 can take the shape of a prestressed spring in an axial direction, enabling a pushing away of the free contacted end of the wave guide 3 from the hollow return conductor from the end of the return conductor 3* so that the wave guide 3 is never subjected to stressed, but is rather unloaded or subject to tension loads.

FIG. 9c shows a different detail at this location, in which a mesh 18 of an electrically conductive material, which preferably surrounds the wave guide 3 completely, extends from the front end of wave guide 3 to the free ending circumference of the hollow return conductor 3*.

In contrast to this, the hollow return conductor 3* also extends, as shown in FIG. 9b, over the damping range so that the wave guide 3, protruding from the spacer hose 21, with the damper arrangement 12 placed over it, is still located within the axial range of the hollow return conductor 3*.

At its free end this component is closed by an in-place cover 16a, which in this case however, consists of an electrically conducting material and is connected electrically conducting with the wave guide 3 at the center and with the front face of the hollow return conductor 3* in the area of the circumference.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

List of Symbols
1 detector casing
1a connecting lead
2 crimping location
3 wave guide
3* return conductor, hollow
4 anchor component
5 detector coil
5a,b connections
105 detector arrangement
6 sealing compound
7 end casing
8 electric conductor
9 damper hose
10 direction of measurement
11 point of contact 12a,b crimping location
12 damper arrangement
13a pre-damper
13b main damper
14 isolator casing
15 coil core
16 end cover
18 electrical mesh
20 external strip
21 spacer hose
22 external hose
23 elevation
24 elevation
25 front crimping location
27 contact casing
26 end cover
30 flux body
30a,b half (single side)
30c C-component
50 detector circuitry

The invention claimed is:

1. A position sensor based on the travel time principle of a mechanically elastic wave, said sensor comprising:
 a wave guide having a detector range, a free end, and a center range located between the detector range and free end;
 an electric hollow return conductor formed of an electrically conductive, non magnetic material surrounding the wave guide;
 a detector coil attached to the wave guide in its detector range, as well as; and
 a position element movable along the wave guide and positioned inside said hollow return conductor within the center range of said wave guide.

2. A position sensor per claim 1 wherein said hollow return conductor is made of metal.

3. A position sensor in accordance with claim 1 wherein said hollow return conductor features a thermal expansion in a longitudinal direction, which corresponds to that of said wave guide, and which contains titanium and/or graphite.

4. A position sensor in accordance with claim 1 wherein said hollow return conductor features a circumferentially closed cross section.

5. A position sensor in accordance with claim 1 wherein said hollow return conductor has a jacket surface with penetrations therein and a plurality of individual conductors distributed over the circumference and oriented within the outer jacket of said hollow return conductor at an oblique angle with respect to a longitudinal direction.

6. A position sensor in accordance with claim 1 wherein said hollow return conductor has individual fibers that have no contact with each other.

7. A position sensor in accordance with claim 1 wherein said hollow return conductor has individual fibers that have contact with each other and are components of a hoselike mesh.

8. A position sensor in accordance with claim 1 wherein the length of said hollow return conductor is variable in a longitudinal direction, is elastic, and the length of said return conductor relative to said wave guide is selected such that due to temperature generated length variations said wave guide is not loaded in an axial direction by said hollow return conductor or only in tension.

9. A position sensor in accordance with claim 1 wherein said hollow return conductor is made of a material having a thermal expansion coefficient identical or similar a support pipe.

10. A position sensor in accordance with claim 1 wherein said wave guide is located at a defined location within a cross section of said hollow return conductor.

11. A position sensor in accordance with claim 10 wherein a spacer tube or hose consisting of an electrically non conductive and non magnetic material is placed in the cross section between said wave guide and said hollow return conductor as a spacer.

12. A position sensor in accordance with claim 11 wherein said spacer tube sits close to an outer circumference of said wave guide at specially defined axial intervals and as a wave support under prestress particularly generated by radial constrictions, by swaging, as for example burls, indentations, or ring grooves, of said hollow return conductor.

13. A position sensor according to claim 1 wherein said position element is a position magnet.

14. A position sensor according claim 1 wherein said hollow return conductor is made of brass.

15. A position sensor in accordance with claim 1 wherein said wave guide is concentrically located at a defined location within a cross section of said hollow return conductor.

* * * * *